United States Patent
Marshall (10) Patent No.: US 11,384,224 B1
(45) Date of Patent: Jul. 12, 2022

(54) CELLULOSE ACETATE FILM WITH OPTICAL PROPERTIES

(71) Applicant: Celanese International Corporation, Irving, TX (US)

(72) Inventor: Jo Marshall, Derby (GB)

(73) Assignee: Celanese International Corporation, Irving, TX (US)

( * ) Notice: Subject to any disclaimer, the term of this patent is extended or adjusted under 35 U.S.C. 154(b) by 149 days.

(21) Appl. No.: 16/594,826

(22) Filed: Oct. 7, 2019

Related U.S. Application Data (60) Provisional application No. 62/741,859, filed on Oct. 5, 2018.

(51) Int. Cl.
| | |
|---|---|
| *C08L 1/12* | (2006.01) |
| *C08K 5/12* | (2006.01) |
| *C08K 5/11* | (2006.01) |
| *B29D 7/01* | (2006.01) |
| *C08K 5/521* | (2006.01) |

(52) U.S. Cl.
CPC .............. *C08L 1/12* (2013.01); *B29D 7/01* (2013.01); *C08K 5/11* (2013.01); *C08K 5/12* (2013.01); *C08K 5/521* (2013.01); *C08L 2201/10* (2013.01); *C08L 2203/16* (2013.01)

(58) Field of Classification Search
CPC ......... C08L 1/12; C08L 2203/16; B29D 7/01; C08K 5/11; C08K 5/12; C08K 5/521; C08K 2201/10

USPC ........................................................... 524/41
See application file for complete search history.

(56) References Cited

U.S. PATENT DOCUMENTS

| | | |
|---|---|---|
| 5,272,967 A | 12/1993 | Held |
| 6,040,053 A | 3/2000 | Scholz et al. |
| 7,393,579 B2 | 7/2008 | Bermel |
| 2005/0043444 A1* | 2/2005 | Ono ............... C08L 1/10 523/332 |
| 2006/0286397 A1* | 12/2006 | McCreight ......... C08B 15/005 428/522 |
| 2011/0166340 A1 | 7/2011 | Shibata et al. |
| 2012/0281179 A1* | 11/2012 | Wang ............... G02C 11/08 351/62 |
| 2015/0079381 A1* | 3/2015 | Parker ............... B32B 27/36 428/220 |
| 2015/0361311 A1 | 12/2015 | Combs et al. |
| 2016/0032020 A1 | 2/2016 | Ukita et al. |
| 2016/0053152 A1 | 2/2016 | Parker et al. |
| 2017/0009056 A1 | 1/2017 | Parker et al. |
| 2017/0158901 A1 | 6/2017 | Bisset et al. |
| 2018/0105661 A1 | 4/2018 | Combs et al. |
| 2018/0194913 A1 | 7/2018 | Parizat et al. |

* cited by examiner

*Primary Examiner* — Hui H Chin (74) *Attorney, Agent, or Firm* — Dority & Manning, P.A.

(57) ABSTRACT

Cellulose acetate films having excellent optical properties are disclosed. The films are made from cellulose acetate and a plasticizer. A solvent cast precursor film is initially formed and then subjected to high temperatures and pressures for improving at least one optical property.

13 Claims, 3 Drawing Sheets

CELLULOSE ACETATE FILM WITH OPTICAL PROPERTIES

RELATED APPLICATIONS

The present application is based upon and claims priority to U.S. Provisional Application Ser. No. 62/741,859, having a filing date of Oct. 5, 2018, which is incorporated herein by reference in its entirety.

BACKGROUND

Cellulose acetate can be formulated in the form of a film having good physical properties and can have heat-resistant characteristics. In the past, for instance, cellulose acetate films have been used as a photographic support. The films made in the past have had good transparency characteristics in combination with good dimensional stability, especially when exposed to moisture and temperature. Cellulose acetate also naturally is resistant to degradation by ultraviolet light and does not readily discolor over time.

In certain applications, cellulose acetate films have been produced with good optical isotropy. Thus, the films have been used in various optical applications, such as being used as a protective film of a polarizing plate in a liquid crystal display. Cellulose acetate has also been used to replace glass in various applications. Cellulose acetate films, for instance, have been used to construct electronic displays found in, for example, personal computers, televisions, cell phones, and the like.

Cellulose acetate polymers can be made with a variety of molecular weights. In addition, the degree of acyl substitution of the hydroxyl groups on the cellulose backbone can be varied and controlled based upon the end use of the polymer. In one embodiment, the cellulose acetate film can be saponified which can dramatically enhance the anti-fog characteristics of the film. Fog resistant cellulose acetate films, for instance, may be formed by treating a cellulose acetate film with an alkali solution.

Although cellulose acetate films can be used in numerous applications, various disadvantages still remain. For example, cellulose acetate films are subject to optical distortions that can render the films unusable in applications where superior or high-grade optical properties are required such as when forming sports goggles, motorcycle visors, and the like.

In view of the above, a need currently exists for cellulose acetate films and a process for producing the films that have enhanced optical properties and, for instance, improved optical power.

SUMMARY

In general, the present disclosure is directed to cellulose acetate films having improved optical performance. For instance, films made in accordance with the present disclosure can have excellent transparency properties with little to no optical distortions.

In one embodiment, for instance, the present disclosure is directed to a film that includes a first planar surface opposite a second planar surface. The film comprises a cellulose acetate polymer combined optionally with a plasticizer. The film can be initially formed through a solvent cast process. In a solvent cast process, the polymer and plasticizer can be contacted with a solvent to form a dope. The dope can have a relatively high viscosity and can be applied to a continuous highly polished metal band or drum through an extrusion die. The film is then removed from the metal support and optionally dried in an oven to completely remove the solvent.

Once the cast film or precursor film is formed, in accordance with the present disclosure, the film is subjected to heat and pressure in an amount sufficient to improve at least one optical property of the film, such as improving the optical power of the film. For example, in one embodiment, the film is subjected to both increased heat and pressure simultaneously while being positioned in between two opposing polished or smooth surfaces, such as polished metal surfaces. For example, in one embodiment, a film made from cellulose acetate and a plasticizer can be fed through a double band press that is equipped with two opposing polished surfaces that can apply increased heat and pressure to the film.

Films made according to the present disclosure can have an excellent blend of properties. For instance, the film can have a gloss of greater than about 80, such as greater than about 100, such as greater than about 120, such as greater than about 140, and generally less than about 200 when tested according to ASTM D523. The gloss can be measured on one or both sides of the film at an angle of 60°. In addition to having high gloss characteristics, the film can also have excellent transparent properties. For instance, the film can have a haze of less than about 2%, such as less than about 1%, such as less than about 0.8%, such as less than about 0.7% when tested according to ASTM Test D1003. The thickness of the film can generally vary from about 90 microns to about 2000 microns, such as from about 300 microns to about 1000 microns.

The cellulose acetate films made according to the present disclosure can also have an improved optical power. For instance, when tested according to standard EN167.3.1, the film can be graded as Class 1.

The film can be used alone and can comprise a single layer product. In one embodiment, the film can be made exclusively from cellulose acetate by combining together multiple layers of cellulose acetate. Alternatively, the film can be laminated to other substrates, such as a polycarbonate film, a polyester film, a glass substrate, or the like. Various different products can incorporate the film of the present disclosure. For instance, the film can constitute a lens or eye piece in a pair of sports goggles, such as ski goggles. Alternatively, the film can be used to construct a face shield, such as a face shield for a motorcycle helmet. In still another embodiment, the film can be used to produce digital display screens, three-dimensional glasses, sunglasses, or the like.

The present disclosure is also directed to a process for producing a film. The process includes casting a dope to form a film. The dope includes a cellulose acetate blended with a plasticizer. The cellulose acetate, for instance, may comprise cellulose diacetate. In one embodiment, the plasticizer comprises triacetin, tris(clorisopropyl) phosphate, dimethyl phthalate, tris(2-chloro-1-methylethyl) phosphate, diethyl phthalate, or mixtures thereof.

In one embodiment, the process is carried out using a double band press. The double band press includes two opposing polished surfaces that can apply both heat and pressure to the film. For example, in one embodiment, the film can be heated to a temperature of from about 160° C. to about 190° C. while also being subjected to a pressure of from about 9 bar to about 12 bar. The film can be subjected to heat and pressure for a time of from about 30 seconds to about 600 seconds. In one embodiment, after being subjected to heat and pressure, the film can be actively cooled. For example, the film can be cooled to a temperature of from about 18° C. to about 25° C. The cooling step can occur in a time of from about 30 seconds to about 300 seconds.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures.

Repeat use of reference characters in the present specification and drawings is intended to represent the same or analogous features or elements of the present invention.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to cellulose acetate films having improved optical properties and to a process for producing the films. In the past, cellulose acetate films were known to possess inherent optical distortions. The films failed to have similar optical characteristics in comparison to other transparent materials. Consequently, use of cellulose acetate film in high end optical applications was limited.

The present disclosure, however, is directed to minimizing or eliminating optical distortion properties that were experienced in the past. In this regard, the present disclosure is directed to films made from cellulose acetate that have dramatically improved optical properties, such as greater transparency and lower optical distortion. In general, in order to produce films made according to the general disclosure, solvent cast precursor films are first formed from a dope. The precursor film is then simultaneously subjected to heat and pressure for a time sufficient in order to improve at least one optical property. In one embodiment, for instance, the precursor film can be sandwiched in between two opposing polished plates, such as polished chrome-plated steel or polished stainless steel plates. The plates can be designed to apply both heat and pressure to the precursor film. Applying heat and pressure in this manner has been found to unexpectedly and dramatically improve the optical properties of the film. For example, in one embodiment, the process of the present disclosure can improve the optical power of the film.

For example, the optical power of a cellulose acetate film can be measured using test standard EN167.3.1 by measuring the spherical refractive power and the astigmatic refractive power. Through the process of the present disclosure, cellulose acetate films can be produced that have a Class 1 rating according to the above standard method.

Cellulose Acetate Composition and Film

A precursor film is initially prepared, preferably by solvent casting a dope comprising cellulose acetate, optionally a plasticizer and a solvent.

Cellulose acetate may be formed by esterifying cellulose after activating the cellulose with acetic acid. The cellulose may be obtained from numerous types of cellulosic material, including but not limited to plant derived biomass, corn stover, sugar cane stalk, bagasse and cane residues, rice and wheat straw, agricultural grasses, hardwood, hardwood pulp, softwood, softwood pulp, cotton linters, switchgrass, bagasse, herbs, recycled paper, waste paper, wood chips, pulp and paper wastes, waste wood, thinned wood, willow, poplar, perennial grasses (e.g., grasses oftheMiscanthus family), bacterial cellulose, seed hulls (e.g., soy beans), cornstalk, chaff, and other forms of wood, bamboo, soyhull, bast fibers, such as kenaf, hemp, jute and flax, agricultural residual products, agricultural wastes, excretions of livestock, microbial, algal cellulose, seaweed and all other materials proximately or ultimately derived from plants. Such cellulosic raw materials are preferably processed in pellet, chip, clip, sheet, attritioned fiber, powder form, or other form rendering them suitable for further purification.

Cellulose esters suitable for use in producing the composition of the present disclosure may, in some embodiments, have ester substituents that include, but are not limited to, $C_1$-$C_{20}$ aliphatic esters (e.g., acetate, propionate, or butyrate), functional $C_1$-$C_{20}$ aliphatic esters (e.g., succinate, glutarate, maleate) aromatic esters (e.g., benzoate or phthalate), substituted aromatic esters, and the like, any derivative thereof, and any combination thereof. Cellulose esters suitable for use in producing the composition of the present disclosure may, in some embodiments, have a molecular weight ranging from a lower limit of about 10,000, 15,000, 25,000, 50,000, or 85,000 to an upper limit of about 125,000, 100,000, or 85,000, and wherein the molecular weight may range from any lower limit to any upper limit and encompass any subset therebetween. In one embodiment, the number average molecular weight of the cellulose acetate may range from 40,000 amu to 100,000 amu, e.g., from 50,000 amu to 80,000 amu.

The cellulose acetate used in the composition may be cellulose diacetate or cellulose triacetate. In one embodiment, the cellulose acetate comprises primarily cellulose diacetate. In one embodiment, for instance, the cellulose acetate can have a degree of substitution of from about 2.3 to about 2.7, such as from about 2.4 to about 2.5. In one embodiment, the cellulose acetate can have a degree of substitution of about 2.45.

In some embodiments, the cellulose acetate in the composition comprises less than 1 wt. % cellulose triacetate, e.g., less than 0.5 wt. % or less than 0.1 wt. %. In some cases, the cellulose acetate in the composition consists essentially of cellulose diacetate.

The cellulose acetate may be utilized in powder or flake form, preferably flake form, to form the dope used in a solvent casting process to form the precursor film. In other embodiments, the cellulose acetate, in powder or flake form, may be formulated and injection molded into pellets that may be formed into the precursor film. The flake form of cellulose acetate may have an average flake size from 5 μm to 10 mm, as determined by sieve analysis. The flake can have low moisture content, optionally comprising less than 6 wt. % water, e.g., less than 5 wt. % water or less than 2.5 wt. % water. In terms of ranges, the flake form may have from 0.01 to 6 wt. % water, e.g., from 0.1 to 2.5wt. % water or from 0.5 to 2.45 wt. % water.

In forming the solvent cast precursor film, the cellulose acetate may optionally be combined with a plasticizer. The plasticizer may vary widely. Suitable plasticizers may, in some embodiments, include, but are not limited to, triacetin, trimethyl phosphate, triethyl phosphate, tributyl phosphate, triphenyl phosphate, tris(2-chloro-1-methylethyl) phosphate, triethyl citrate, acetyl trimethyl citrate, acetyl triethyl citrate, acetyl tributyl citrate, dibutyl phthalate, diaryl phthalate, diethyl phthalate, dimethyl phthalate, di-2-methoxyethyl phthalate, di-octyl phthalate (and isomers), dibutyl tartrate, ethyl o-benzoylbenzoate, ethyl phthalyl ethyl glycolate, methyl phthalyl ethyl glycolate, n-ethyltoluenesulfonamide, o-cresyl p-toluenesulfonate, aromatic diol, substituted aromatic diols, aromatic ethers, tripropionin, polycaprolactone, glycerin, glycerin esters, diacetin, polyethylene glycol, polyethylene glycol esters, polyethylene glycol diesters, di-2-ethylhexyl polyethylene glycol ester, diethylene glycol, polypropylene glycol, polyglycoldiglycidyl ethers, dimethyl sulfoxide, N-methyl pyrollidinone, propylene carbonate, $C_1$-$C_{20}$ diacid esters, dimethyl adipate (and other dialkyl esters), resorcinol monoacetate, catechol, catechol esters, phenols, epoxidized soy bean oil, castor oil, linseed oil, epoxidized linseed oil, other vegetable oils, other seed oils, difunctional glycidyl ether based on polyethylene glycol, alkylphosphate esters, phospholipids, aromas (including some described herein, e.g., eugenol, cinnamyl alcohol, camphor, methoxy hydroxy acetophenone (acetovanillone), vanillin, and ethylvanillin), and the like, any derivative thereof, and any combination thereof. In some embodiments, plasticizers may be food-grade plasticizers. Examples of food-grade plasticizers may, in some embodiments, include, but are not limited to, triacetin, trimethyl citrate, triethyl citrate, tributyl citrate, eugenol, cinnamyl alcohol, methoxy hydroxy acetophenone (acetovanillone), vanillin, ethylvanillin, polyethylene glycols, and the like, and any combination thereof.

In one embodiment, the plasticizer is selected from the group consisting of 1,2,3-triacetoxypropane (triacetin), tributyl citrate, diethyl phthalate, triethyl citrate, triphenyl phosphate, tris(clorisopropyl)phosphate, dimethyl phthalate, bornan-2-one, PEG-DGE, PPG-DGE, tributyl phosphate, and combinations thereof. In one embodiment the plasticizer comprises a phthalate plasticizer. In preferred embodiments, the plasticizer comprises diethyl phthalate.

In some embodiments, the composition, and the dope preferably used to form the composition, may further comprise one or more additional additives, e.g., tackifiers, flame retardants, antioxidants, antibacterial agents, antifungal agents, colorants, pigments, dyes, UV-stabilizers, viscosity modifiers, processing additives, aromas, and the like, and any combination thereof. The amount of the additives may vary widely. Generally speaking the one or more additives may be present in an amount ranging from 0.01 to 10 wt. %, based on the total weight of the composition, e.g., from 0.03 to 2 wt. %, or from 0.1 to 1 wt. %.

Tackifiers may, in some embodiments, increase the adhesive properties of the composition described herein. Tackifiers suitable for use in conjunction with the composition described herein may, in some embodiments, include, but are not limited to, methylcellulose, ethylcellulose, hydroxyethylcellulose, carboxy methylcellulose, carboxy ethylcellulose, amides, diamines, polyesters, polycarbonates, silyl-modified polyamide compounds, polycarbamates, urethanes, natural resins, natural rosins, shellacs, acrylic acid polymers, 2-ethylhexylacrylate, acrylic acid ester polymers, acrylic acid derivative polymers, acrylic acid homopolymers, anacrylic acid ester homopolymers, poly(methyl acrylate), poly(butyl acrylate), poly(2-ethylhexyl acrylate), acrylic acid ester co-polymers, methacrylic acid derivative polymers, methacrylic acid homopolymers, methacrylic acid ester homopolymers, poly(methyl methacrylate), poly(butyl methacrylate), poly(2-ethylhexyl methacrylate), acrylamido-methyl-propane sulfonate polymers, acrylamido-methyl-propane sulfonate derivative polymers, acrylamidomethyl-propane sulfonate co-polymers, acrylic acid/acrylamido-methyl-propane sulfonate co-polymers, benzyl coca di-(hydroxyethyl) quaternary amines, p-T-amyl-phenols condensed with formaldehyde, dialkyl amino alkyl (meth)acrylates, acrylamides, N-(dialkyl amino alkyl) acrylamide, methacrylamides, hydroxy alkyl (meth)acrylates, methacrylic acids, acrylic acids, hydroxyethyl acrylates, and the like, any derivative thereof, and any combination thereof. In some embodiments, tackifiers suitable for use in conjunction with the composition described herein may be food-grade tackifiers. Examples of food-grade tackifiers may, in some embodiments, include, but are not limited to, methylcellulose, ethylcellulose, hydroxyethylcellulose, carboxy methylcellulose, carboxy ethylcellulose, natural resins, natural rosins, and the like, and any combination thereof.

Flame retardants suitable for use in conjunction with the composition described herein may, in some embodiments, include, but are not limited to, phosphates, catechol phosphates, resorcinol phosphates, aromatic polyhalides, and the like, and any combination thereof.

Antifungal agents suitable for use in conjunction with the composition described herein may, in some embodiments, include, but are not limited to, polyene antifungals, e.g., natamycin, rimocidin, filipin, nystatin, amphotericin B, candicin, and hamycin, imidazole antifungals such as miconazole (available as MICATIN® from WellSpring Pharmaceutical Corporation), ketoconazole (commercially available as NIZORAL® from McNeil consumer Healthcare), clotrimazole (commercially available as LOTRAMIN® and LOTRAMIN AF® available from Merck and CANESTEN® available from Bayer), econazole, omoconazole, bifonazole, butoconazole, fenticonazole, isoconazole, oxiconazole, sertaconazole (commercially available as ERTACZO® from OrthoDematologics), sulconazole, and tioconazole; triazole antifungals such as fluconazole, itraconazole, isavuconazole, ravuconazole, posaconazole, voriconazole, terconazole, and albaconazole), thiazole antifungals (e.g., abafungin), allylamine antifungals (e.g., terbinafine (commercially available as LAMISIL® from Novartis Consumer Health, Inc.), naftifine (commercially available as NAFTIN® available from Merz Pharmaceuticals), and butenafine (commercially available as LOTRAMIN ULTRA® from Merck), echinocandin antifungals (e.g., anidulafungin, caspofungin, and micafungin), polygodial, benzoic acid, ciclopirox, tolnaftate (e.g., commercially available as TINACTIN® from MDS Consumer Care, Inc.), undecylenic acid, flucytosine, 5-fluorocytosine, griseofulvin, haloprogin, and any combination thereof.

Colorants, pigments, and dyes suitable for use in conjunction with the composition described herein may, in some embodiments, include, but are not limited to, plant dyes, vegetable dyes, titanium dioxide, silicon dioxide, tartrazine, El 02, phthalocyanine blue, phthalocyanine green, quinacridones, perylene tetracarboxylic acid di-imides, dioxazines, perinones disazo pigments, anthraquinone pigments, carbon black, metal powders, iron oxide, ultramarine, nickel titanate, benzimidazolone orange gl, solvent orange 60, orange dyes, calcium carbonate, kaolin clay, aluminum hydroxide, barium sulfate, zinc oxide, aluminum oxide, CARTASOL® dyes (cationic dyes, available from Clariant Services) in liquid and/or granular form (e.g., CARTASOL Brilliant Yellow K-6G liquid, CARTASOL Yellow K-4GL liquid, CARTASOL Yellow K-GL liquid, CARTASOL Orange K-3GL liquid, CARTASOL Scarlet K-2GL liquid, CARTASOL Red K-3BN liquid, CARTASOL Blue K-5R liquid, CARTASOL Blue K-RL liquid, CARTASOL Turquoise K-RL liquid/granules, CARTASOL Brown K-BL liquid), FASTUSOL® dyes (an auxochrome, available from BASF) (e.g., Yellow 3GL, Fastusol C Blue 74L), and the like, any derivative thereof, and any combination thereof. In some embodiments, when the colorant is titanium dioxide is utilized as the colorant, the titanium dioxide may also function to increase the stiffness of the film. In one embodiment, solvent dyes may be employed.

In one embodiment, the composition used to form the film is free of any conventional anti-blocking agents, such as various particles including oxides, carbonates, talc, and the like.

The composition, in one embodiment, comprises from 60 wt. % to 95 wt. % cellulose acetate, e.g., from 65 wt. % to 90 wt. %, from 70 wt. % to 90 wt. %, or from 75 wt. % to 85 wt. %. In terms of lower limits, the composition may comprise at least 60 wt. % cellulose acetate, e.g., at least 65 wt. %, at least 70 wt. % or at least 75 wt. %. In terms of upper limits, the composition may comprise less than 95 wt. % cellulose acetate, e.g., less than 90 wt. % or less than 85 wt. %.

The composition, in one embodiment, comprises from 5 wt. % to 40 wt. % plasticizer, e.g., from 5 wt. % to 35 wt. %, from 10 wt. % to 30 wt. %, or from 15 wt. % to 25 wt. %. In terms of lower limits, the composition may comprise at least 60 wt. % plasticizer, e.g., at least 5 wt. %, at least 10 wt. % or at least 15 wt. %. In terms of upper limits, the composition may comprise less than 95 wt. % plasticizer, e.g., less than 40 wt. %, less than 35 wt. %, less than 30 wt. %, or less than 25 wt. %.

In some embodiments, the composition further comprises a releasing agent, which allows the resulting film to release from various components during or after the production process, e.g., releasing from a casting band. In one embodiment, the composition comprises from 0.01 wt. % to 10 wt. % releasing agent, e.g., from 0.05 wt. % to 5 wt. %, from 0.05 wt. % to 1 wt. %, or from 0.05 wt. % to 0.5 wt. %. In one embodiment, the releasing agent comprises stearic acid or sorbitan monostearate. The releasing agent is preferably added to, e.g., mixed into, the dope. In such cases, the release agent preferably is dissolved into the dope. In one embodiment, the releasing agent is deposited or injected onto the casting band upon which the composition is cast. As the composition is released from the casting band, some of the releasing agent may remain with the composition and/or some of the release agent may remain with the casting band (based on the attraction of the release agent to the metal).

After the dope is formulated containing the cellulose acetate, the dope is formed into a precursor film for later treatment with heat and pressure. In one embodiment, the dope is fed through a casting process, e.g. solvent casting, to form the precursor film.

In one embodiment, the dope may be prepared by dissolving cellulose acetate in a solvent. In some embodiments, the solvent is acetone. In one embodiment, the solvent is selected from the group consisting of ethyl lactate, methyl ethyl ketone, and dichloromethane. To improve the solubility of cellulose acetate in acetone, the cellulose acetate and acetone are preferably continuously added to a first mixer. The mixture may then be sent to a second and/or third mixer to allow for full dissolution of the cellulose acetate in the acetone. The mixers may be continuous mixers that are used in series. It is understood that in some embodiments, one mixer may be sufficient to achieve cellulose acetate dissolution.

Once the cellulose acetate and plasticizer has been dissolved in the acetone solvent, the dope may then be filtered to remove impurities. In some embodiments, the filtering is a two-stage filtration.

In one embodiment, the dope is formed with a relatively high viscosity. The dope is then fed through an extrusion die and applied to a continuous highly polished metal band or drum to form a film. The film is then removed from the polished metal surface and dried using, for example, an oven.

Once the solvent cast film is formed, the film can optionally be subjected to various pretreatments prior to undergoing a process for improving the optical properties of the film. For example, in one embodiment, the film can be pretreated in order to provide the film with anti-fog properties and characteristics. For example, in one embodiment, the solvent cast film can be contacted with a caustic solution that serves to partially or completely saponify the film which can be used to control the degree of substitution of the cellulose acetate. For instance, the film can be saponified so that the cellulose acetate has a degree of substitution of less than about 2.6, such as less than about 2.5, such as less than about 2.0, such as less than about 1.5, such as less than about 1.0.

After the precursor film is formed, in accordance with the present disclosure, the film is simultaneously subjected to high temperatures and pressures sufficient to improve at least one optical property of the film. In one embodiment, for instance, the precursor film can be placed in between two flat and/or polished surfaces. The surfaces can be made from any suitable material, such as stainless steel or chrome plated steel. The surfaces can press against the film and subject the film to increased pressure. The surfaces can also be heated for increasing the temperature of the film while pressure is applied. Alternatively, the opposing surfaces can be placed in an oven or heating device while pressure is applied to the film.

The temperature and pressure to which the film is subjected can depend upon various factors and upon the desired result. In one embodiment, for instance, the film is heated to a temperature of greater than about 150° C., such as greater than about 160° C., such as greater than about 165° C., such as greater than about 170° C., such as greater than about 175° C., such as greater than about 180° C. and generally less than about 185° C., such as less than about 180° C. The pressure applied to the film during heating can be greater than about 5 bar, such as greater than about 8 bar, such as greater than about 9 bar, such as greater than about 10 bar, and generally less than about 15 bar, such as less than about 12 bar, such as less than about 11 bar. The film can be subjected to the above temperatures and pressures for a time of at least about 30 seconds, such as at least about 40 seconds, such as at least about 50 seconds, such as at least about 60 seconds, such as at least about 70 seconds, such as at least about 80 seconds, such as at least about 90 seconds and generally less than about 600 seconds, such as less than about 500 seconds, such as less than about 400 seconds, such as less than about 300 seconds, such as less than about 200 seconds, such as less than about 150 seconds.

After being subjected to heat and pressure, the film can be cooled using different methods. In one embodiment, for instance, the film can be cooled in ambient air. Alternatively, the film can be actively cooled while still in contact with the flat surfaces and optionally while still being subjected to higher pressures. The film can be cooled, for instance, to a temperature of from about 18° C., to about 23° C. In one embodiment, the film is actively cooled down to the above temperature range over a time period of less than about 300 seconds, such as less than about 200 seconds, such as less than about 150 seconds, such as less than about 125 seconds, such as less than about 110 seconds. In general, it takes at least 30 seconds to cool the film, such as at least 40 seconds, such as at least 50 seconds.

Various different devices and processes can be used in order to subject the film to higher temperatures and to the above described higher pressures. In one embodiment, for example, the film can be placed inbetween two metal plates. The plates can be static or can move like a conveyor. In one embodiment, for instance, a band press can be used in order to apply heat and pressure. For example, referring to FIG. 1, one embodiment of a band press 10 that may be used in accordance with the present disclosure is shown.

Figure 1:
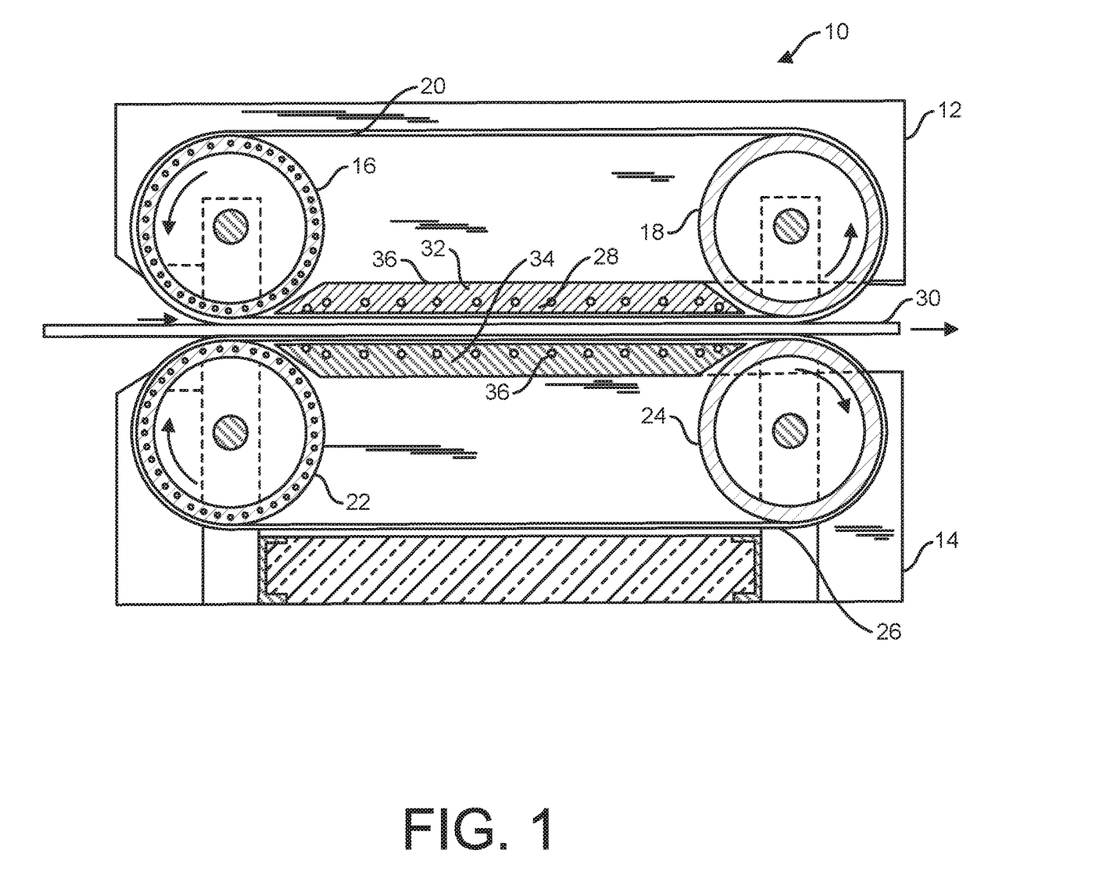
FIG. 1 is a cross sectional view of one embodiment of an apparatus for applying heat and pressure to a cellulose acetate film in accordance with the present disclosure.

The band press 10 includes a first band press unit 12 positioned opposite a second band press unit 14. The first band press unit 12 includes a pair of reversing drums 16 and 18. An endless press band 20 is wound around the drums 16 and 18. In one embodiment, the press band 20 can be stretched by a hydraulic cylinder. Similarly, the second press band unit 14 also includes a pair of drums 22 and 24. An endless press band 26 is wound around the drums 22 and 24.

The four drums, 16, 18, 22 and 24 are rotatably supported within the press band 10. At least one drum of each press band unit 12, 14 is driven by a motor. In one embodiment, the press band units 12 and 14 are synchronized such that the press bands 20 and 26 move at substantially the same speed in the same direction as shown by the arrows on the drums 16, 18, 22 and 24.

The press band 10 can include a reaction zone 28 located in between the opposing press bands 20 and 26. As shown in FIG. 1, a precursor film 30 made from cellulose acetate in accordance with the present disclosure is shown being fed through the reaction zone 28 of the press band 10. When present within the reaction zone 28, the film 30 can be subjected to higher temperatures or lower temperatures in conjunction with increased pressure.

In this regard, the press band 10 includes a pair of opposing pressure plates 32 and 34. A first pressure plate 32, for instance, is contained within the first press band unit 12, while a second pressure plate 34 is contained in the second press band unit 14. The pressure plates 32 and 34 are designed to apply pressure to the film 30 when located in the reaction zone 28. In one embodiment, pressure is transmitted from the pressure plates 32 and 34 hydraulically to the press bands 20 and 26. In this manner, the press bands 20 and 26 can apply pressure to the film 30. For transmitting pressure, a pressurized fluid can be placed in the space between each pressure plate 32 and 34 and the inner side of each corresponding press band 20 and 26. This area may be referred to as a pressure chamber and can be bound by seals resting against the inner side of each respective press band. The fluid agent may comprise an oil, such as a synthetic oil. In other embodiments, however, the fluid agent may comprise a gas, such as compressed air. As shown in FIG. 1, apertures 36 can be provided in the pressure plates 32 and 34 for supplying the pressure agent into the pressure chamber.

Increased or decreased temperatures can be provided to the reaction zone 28 using various different techniques and methods. In one embodiment, at least one drum of each press band unit 12 and 14 can be designed to be heated and cooled. For instance, the drums 16, 18, 22 and/or 24 can be designed to receive a heated or cooled thermal carrier agent. When heat is supplied, heat can flow from the drums 16, 18, 22 and 24 to the corresponding press bands 20 and 26. The heat then can be conveyed into the reaction zone 28 and transferred to the film 30 while pressure is also be applied to the film.

In addition to heating the drums 16, 18, 22 and 24 supplemental heat can also be provided. For instance, heated or cooled fluid can also be provided to the pressure chamber through the plates 32 and 34.

In one embodiment, the press bands 20 and 26 are made from a highly polished material. Placing the film 30 in between two polished surfaces, for instance, has been found to dramatically improve at least one optical property of the film 30. For example, in one embodiment, the press bands 20 and 26 have a highly polished surface with little to no surface roughness. For instance, the surface of each press band can have a roughness total, Rt, of less than about 0.1 microns, such as less than about 0.08 microns, such as less than about 0.07 microns. The roughness total, for instance, can be from about 0.07 microns to about 0.04 microns. The surface of the press bands can have a roughness total average, Rz, of less than about 0.08 microns, such as less than about 0.06 microns. The roughness total average, for instance, can be from about 0.06 microns to about 0.03 microns. The surface of the press bands can have an arithmetical average, Ra, of less than about 0.02 microns. Although unknown, it is believed that the dramatically improved optical properties obtained according to the present disclosure occur due to the combination of using a solvent cast film in conjunction with placing the film between two highly polished surfaces as described above.

Using the press band 10 as shown in FIG. 1, pressure can be applied to the film 30 while the film is being heated or cooled. For example, the film can be heated to a temperature of from about 150° C. to about 185° C., such as to a temperature of from about 160° C. to about 180° C. The pressure applied to the film 30 can be from about 8 bar to about 15 bar, such as from about 9 bar to about 12 bar. The speed at which the film 30 is conveyed through the press band 10 determines the retention time of the film 30 within the reaction zone 28. During heating, for instance, the retention time can be generally from about 30 seconds to about 600 seconds, such as from about 50 seconds to about 125 seconds. If the film is subjected to a cooling cycle, the retention time during cooling can be also from about 30 seconds to about 300 seconds, such as from about 50 seconds to about 125 seconds.

Performance Characteristics

The process of the present disclosure can dramatically improve the optical properties of the film. The process of the present disclosure, for instance, can substantially eliminate optical distortions. For example, the optical power of the solvent cast film can be unexpectedly improved. When tested according to standard test EN167.3.1 and determined by measuring the spherical refractive power and astigmatic refractive power, the film of the present disclosure can obtain a Class 1 rating, which refers to a rating used in high-end optical applications.

The final film product can have a haze value, e.g., an ASTM DI003 haze value, of less than 2%, e.g., less than 1%, less than 0.8%, or less than 0.7%. The haze value of the film is generally greater than about 0.01%. In one embodiment, the haze may be measured by a hazemeter. In one embodiment, haze may be measured with properly sized specimens having substantially plane-parallel surfaces, e.g., flat without wrinkling, free of dust, scratches, and particles, of about 0.85 mm in thickness using an UtraScan Pro analyzer from Hunter Labs with haze setting of D65/10.

In one embodiment, at least one side of the film can have a gloss rating of greater than about 90, such as greater than about 100, such as greater than about 110, such as greater than about 120, such as greater than about 130, such as greater than about 140, such as greater than about 150 and generally less than about 300, such as less than about 250. Gloss can be measured using ASTM Test D523 at an angle of 60°.

In one embodiment, the film has a moisture (water) vapor transmission rate (MVTR) ranging from 100 g/m$^2$/day to 1000 g/m$^2$/day (at 25° C. and 75% relative humidity), e.g., from 200 g/m$^2$/day to 1000 g/m$^2$/day or from 250 g/m$^2$/day to 750 g/m$^2$/day. Water vapor transmission rate may be measured by gravimetric techniques. In one embodiment, the water vapor transmission rate is measured as noted in one of the following ASTM test standards: ASTM F1249-06, ASTM E398-03, ASTM D1434, ASTM D3079, ASTM D4279, ASTM E96, ASTM E398, ASTM F1249, ASTM F2298, or ASTM F2622.

In one embodiment, the film has a transparency ranging from 70% to 100%, as measured by ASTM D1746, e.g., from 80% to 99%.

In one embodiment, the film has a tensile strength ranging from 40 Nmm$^{-2}$ to 140 Nmm$^{-2}$, as measured by ASTM D882, e.g., from 70 Nmm$^{-2}$ to 110 Nmm$^{-2}$.

In one embodiment, the film has an elongation ranging from 20% to 60%, as measured by ASTM D882, e.g., from 25% to 55%.

In one embodiment, the film has a Young's modulus ranging from 1400 Nmm$^{-2}$ to 2400 Nmm$^{-2}$, as measured by ASTM D882, e.g., from 1600 Nmm$^{-2}$ to 2200 Nmm$^{-2}$ or from 1800 Nmm$^{-2}$ to 2000 Nmm$^{-2}$.

As described above, in one embodiment, the film of the present disclosure can be formulated so as to have anti-fog properties. When producing anti-fog films, for instance, the films can have a fog time of greater than about 10 seconds, such as greater than about 30 seconds, such as greater than about 50 seconds, such as greater than about 70 seconds and generally less than about 150 seconds when tested according to test methods EN166 and/or EN168.16. Fog time may be determined by placing the film over a beaker of water heated to 50° C. and measuring the time it takes for a fog to form.

The thickness of the film may vary widely, but will generally be greater than 90 microns. In one embodiment, the film has a thickness ranging from 90 microns to 2000 microns, e.g., from 90 microns to 1000 microns, from 90 microns to 750 microns, from 90 microns to 500 microns, or from 90 microns to 200 microns. In terms of lower limits, the thickness of the film may be greater than 90 microns, e.g., greater than 100 microns, greater than 125 microns, greater than 145 microns, greater than 150 microns, greater than 200 microns, or greater than 250 microns. In terms of upper limits, the thickness of the film may be less than 2000 microns, e.g., less than 1000 microns, less than 750 microns, less than 500 microns, or less than 200 microns. Thicknesses may be measured via the methods known in the art, e.g., infrared scanning.

Products

The film made according to the present disclosure can be used in numerous and diverse applications. In one embodiment, the film can be used as a single layer film without being laminated to any other substrates. In other embodiments, however, the film can be laminated to other substrates, such as other transparent films. When incorporated into a multilayer laminate, the laminate may contain more than 2 layers, such as more than 3 layers, and generally less than about 6 layers. The film can be laminated to another substrate using any suitable adhesive or any other technique. In one embodiment, for instance, the film can be laminated to another transparent polymer film, such as a polycarbonate film or a polyester film. In an alternative embodiment, the film can be laminated to a glass substrate.

The list of contemplated consumer products is vast. As one example, the consumer product may be selected from the group consisting of lenses, windows, screens, glass structures, containers, appliances, plastic, optical devices, and visors. The film may be adhered to a consumer product, e.g., the planar surface of the consumer product, with an adhesive.

Examples of other consumer products include, but are not limited to, furniture or components thereof, e.g., carpet and/or fabric coated headboards, chairs, and stools, picture frames, self-adhesive window coverings, e.g., decorative window stickers, window films, and window tinting, light films, light filters, and the like.

In some embodiments, the consumer product includes bags, windows for boxes, wraps, camera lenses, digital display screens, windows, e.g., automotive windows, airplane windows, televisions, any product that utilizes a glass or protective glass, e.g., windows or balcony enclosures.

Figure 2:
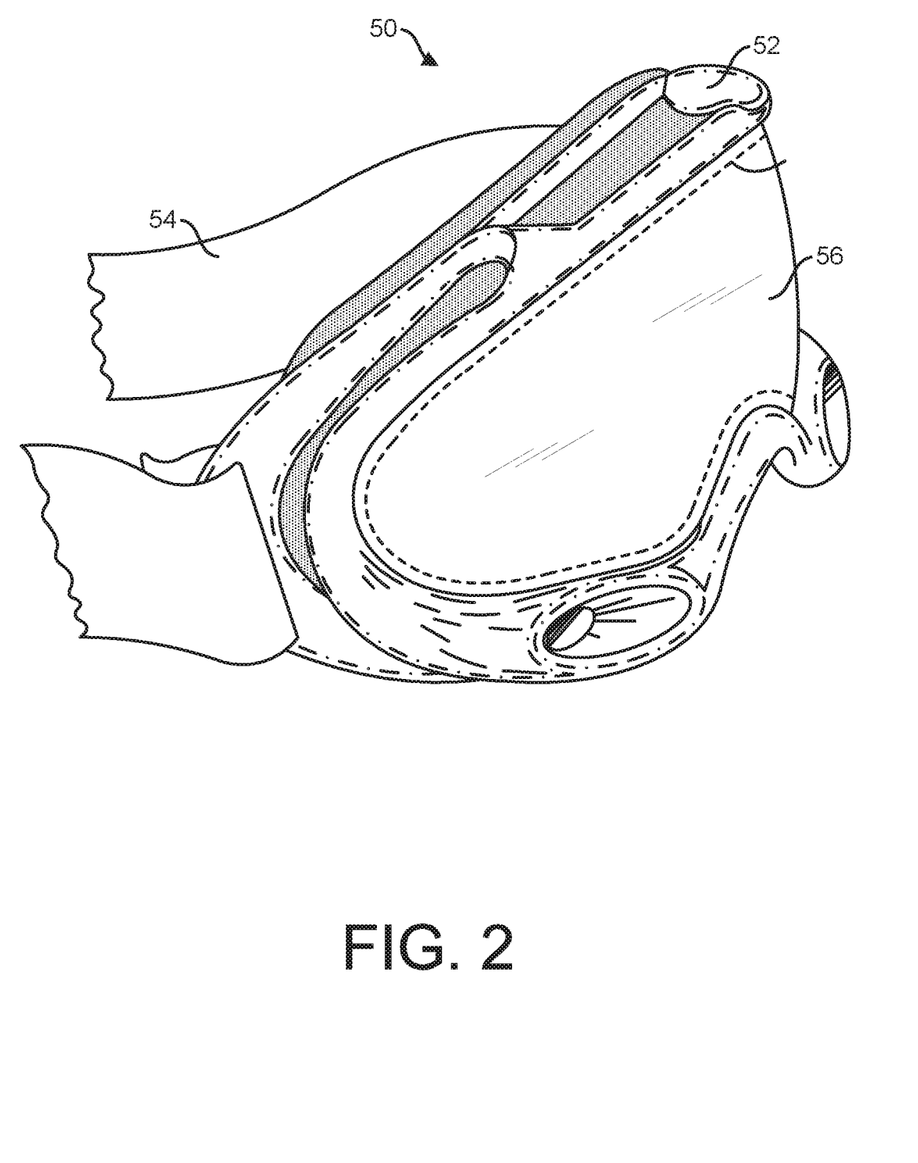
FIG. 2 is a perspective view of a sports goggle made in accordance with the present disclosure.

Films made according to the present disclosure are particularly well suited for use in high end applications where superior optical properties are needed. For instance, in one embodiment, the film can be incorporated into sports eyewear, such as a pair of ski goggles. Referring to FIG. 2, for instance, a pair of athletic or ski goggles 50 are shown. The goggles 50 include a frame 52 attached to a strap 54. The goggles 50 further include a lens 56. The lens 56 can be made from the film of the present disclosure. The film can comprise a single layer film or can comprise a laminate. In another embodiment, the lens 56 can comprise a layer of film made according to the present disclosure spaced from one or more other transparent layers, such as a polycarbonate film. The film of the present disclosure can be separated from the other film using a suitable gasket.

Figure 3:
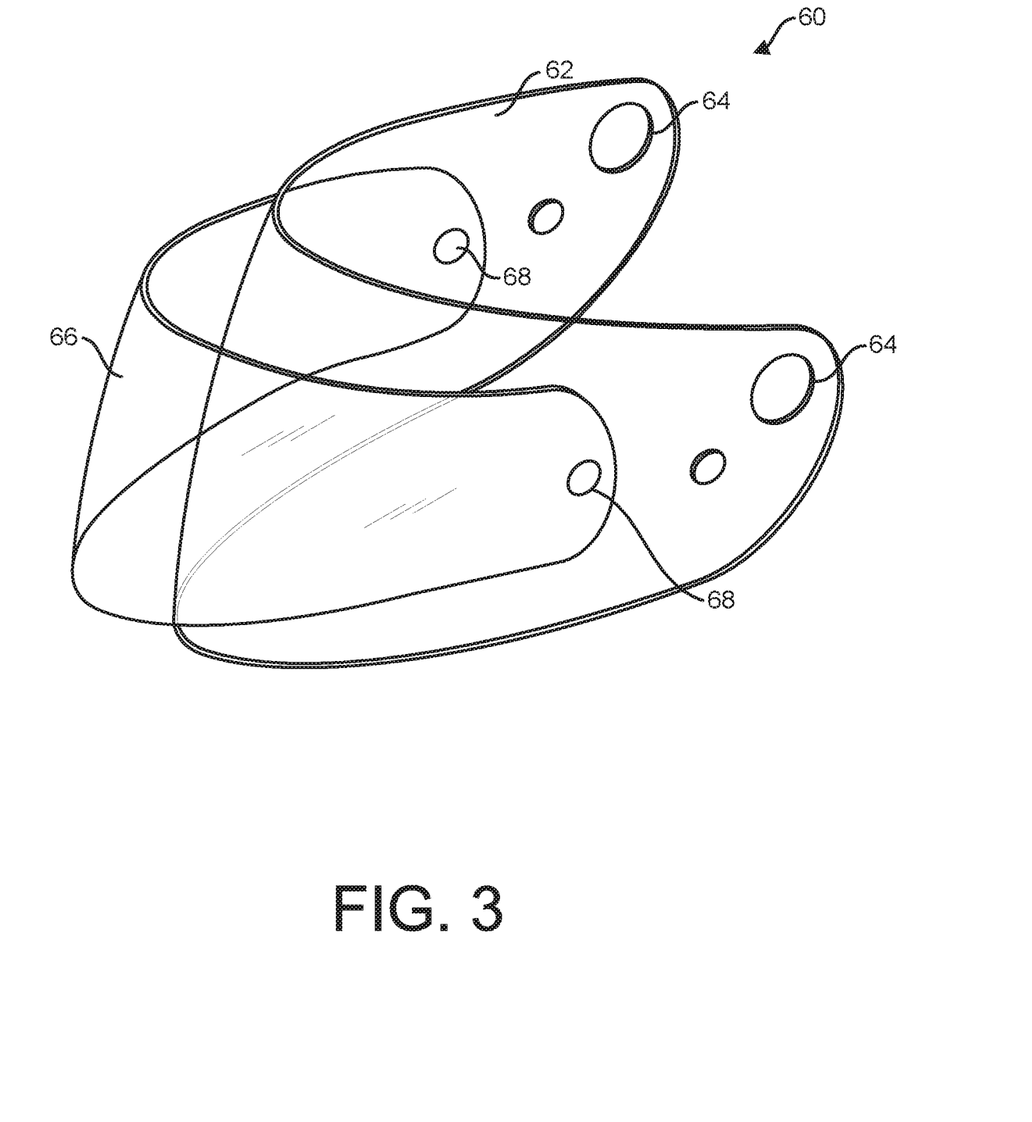
FIG. 3 is a perspective view of a motorcycle visor made in accordance with the present disclosure.

In an alternative embodiment, the film of the present disclosure can be incorporated into a motorcycle visor 60 as shown in FIG. 3. The motorcycle visor 60 includes a frame 62 that is designed to attach to a helmet using, for instance, apertures 64. The visor 60 further includes a lens 66 incorporating the film of the present disclosure. As shown, the lens 66 can be pivotally connected to the frame 62 using pivot points 68.

Example

The following example was conducted to illustrate some of the benefits and advantages to the present disclosure.

Solvent cast films having different thicknesses were fed through a band press at various different conditions. The solvent cast films were made from 79% by weight cellulose diacetate and 21% by weight diethyl phthalate. The solvent cast films were treated with caustic to provide anti-fog properties.

The precursor films were fed through a band press device similar to the one shown in FIG. 1. The band press included press belts made from highly polished stainless steel. For instance, the stainless steel belts had a roughness total of 0.06 microns and had a roughness total average of 0.05 microns. The steel belts were guided around steel drums. Pressure plates were placed adjacent to the press belts for applying pressure to the films being fed through the process.

During the process, the films were subjected to the following process conditions.

TABLE 1

| Sample | Film Thickness | Speed (m/min) | Pressure (Bar) | Heating T (° C.) | Retention times (s) | Cooling T (° C.) | Retention times (s) |
|---|---|---|---|---|---|---|---|
| A | 750 μm | 0.5 | 10 | 170 | 85 | Room Temperature, ~20° C. | 85 |
| B |  | 0.4 | 10.6 | 164 | 106 |  | 106 |
| C | 750 μm | 0.5 | 10.5 | 180 | 85 |  | 85 |
| D | 500 μm | 0.5 | 10.4 | 180 | 85 |  | 85 |
| E |  | 0.5 | 10.4 | 170 | 85 |  | 85 |
| F |  | 0.4 | 10.3 | 170 | 106 |  | 106 |
| G |  | 0.4 | 10.5 | 165 | 106 |  | 106 |

After the process, visual inspection confirmed that the optical power characteristics were improved on the precursor film.

In addition, the films were subjected to a distortion test that measured optical power. The test may be referred to as a Ronchi test. In particular, the films were viewed through a grated lens and magnified to highlight any distortions in the film. The grated lens included vertical lines. There was a noticeable improvement in optical distortion between the precursor films and the films subjected to the band press process.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A final film product produced from a solvent cast precursor film, the solvent cast precursor film having a first planar surface opposite a second planar surface, the precursor film comprising a cellulose acetate combined with a plasticizer, and wherein the precursor film has been subjected to heat and pressure in an amount sufficient to produce a final film product having a Class 1 rating when tested according to test EN167.3.1.

2. The final film product as defined in claim 1, wherein heat and pressure have been applied to the precursor film by two opposing polished surfaces.

3. The final film product as defined in claim 1, wherein heat and pressure have been applied to the precursor film by feeding the film through a band press.

4. The final film product as defined in claim 1, wherein the precursor film has been subjected simultaneously to a temperature range of from about 150° C. to about 185° C. and to a pressure of from about 8 bar to about 15 bar.

5. The final film product as defined in claim 1, wherein the final film product has a thickness of from about 90 microns to about 2000 microns.

6. The final film product as defined in claim 1, wherein at least one surface of the final film product has a gloss of greater than about 100 and less than about 300 when tested according to ASTM Test D-523 at a 60° angle.

7. The final film product as defined in claim 1, wherein the final film product has a haze of less than about 2% when tested according to ASTM Test D1003.

8. The final film product as defined in claim 1, wherein the cellulose acetate consists essentially of cellulose diacetate.

9. The final film product as defined in claim 1, wherein the plasticizer comprises tris(chloroisopropyl) phosphate, dimethyl phthalate, diethyl phthalate, triacetin, tris(2-chloro-1-methylethyl) phosphate, or mixtures thereof.

10. The final film product as defined in claim 1, wherein the precursor film is made exclusively from the cellulose acetate and plasticizer.

11. A laminate comprising the final film product of claim 1 laminated to a substrate, the substrate comprising a glass, a polycarbonate or a polyester.

12. A pair of goggles comprising:
a frame;
a strap attached to the frame; and
a lens comprising the final film product as defined in claim 1.

13. A face shield comprising the final film product as defined in claim 1.

* * * * *